(12) United States Patent
Sangudi et al.

(10) Patent No.: US 6,925,470 B1
(45) Date of Patent: Aug. 2, 2005

(54) METHOD AND APPARATUS FOR DATABASE MAPPING OF XML OBJECTS INTO A RELATIONAL DATABASE

(75) Inventors: Gerald Sangudi, Sunnyvale, CA (US); Sandeep Nawathe, Sunnyvale, CA (US)

(73) Assignee: Amphire Solutions, Inc., Redwood City, CA (US)

( * ) Notice: Subject to any disclaimer, the term of this patent is extended or adjusted under 35 U.S.C. 154(b) by 377 days.

(21) Appl. No.: 10/058,266

(22) Filed: Jan. 25, 2002

(51) Int. Cl.[7] .............................................. G06F 17/30
(52) U.S. Cl. ....................................................... 707/102
(58) Field of Search ..................... 707/1–10, 100–104.1

(56) References Cited

U.S. PATENT DOCUMENTS

| | | | |
|---|---|---|---|
| 6,636,845 B2 * | 10/2003 | Chau et al. ..................... | 707/1 |
| 6,643,633 B2 * | 11/2003 | Chau et al. ..................... | 707/1 |
| 6,721,727 B2 * | 4/2004 | Chau et al. ..................... | 707/3 |
| 2002/0169788 A1 * | 11/2002 | Lee et al. ................ | 707/104.1 |

OTHER PUBLICATIONS

Ken North, "Modeling, metadata and XMl" Jun. 1999, New Architect Daily, WebTechniques.com, pp. 1–9.*

Alex C. Snoeren et al., Mesh–based content routing XML, 2001, ACM Press, New York, NY, pp. 160–173.*

Daniela Florescu, et al., A Performance Evaluation of Alternative Mapping Schemes for Storing XML Data in a Relational Database, Aug. 3, 1999, 24 pp.

* cited by examiner

*Primary Examiner*—Diane D. Mizrahi
(74) *Attorney, Agent, or Firm*—Alan Heimlich, Esq.

(57) ABSTRACT

A method and apparatus for representing an XML data structure as a fixed set of tables in relational database involves grouping at least one XML node and possibly any sub-node into a relationship, generating a fixed sized table for the grouping, possibly repeating groupings and generating tables, and creating references to any repeated groupings and tables until the XML data structure is completed.

1 Claim, 18 Drawing Sheets

Employee 301

| Name 302 | DOB 304 | Fitness 306 |
|---|---|---|
| Patrick 308 | 1/1/1 | Good |
| Nancy 310 | 10/10/10 | Bad |
| Bill 312 | 1/2/3 | Okay |

FIG. 3A (Prior Art)

Employee 301

| Name 302 | DOB 304 | Fitness 306 | Diet 322 |
|---|---|---|---|
| Patrick 308 | 1/1/1 | Good | Healthy |
| Nancy 310 | 10/10/10 | Bad | Poor |
| Bill 312 | 1/2/3 | Okay | Okay |

FIG. 3B (Prior Art)

Employee 301

| Name 302 | DOB 304 | Fitness 306 | Breakfast 342 | Lunch 344 | Dinner 346 |
|---|---|---|---|---|---|
| Patrick 308 | 1/1/1 | Good | Healthy | Okay | Poor |
| Nancy 310 | 10/10/10 | Bad | Okay | Healthy | Poor |
| Bill 312 | 1/2/3 | Okay | Okay | Poor | Healthy |

Employee 301

| Name 302 | DOB 304 | Fitness 306 | Diet 422 |
|---|---|---|---|
| Patrick 308 | 1/1/1 | Good | T2 |
| Nancy 310 | 10/10/10 | Bad | T2 |
| Bill 312 | 1/2/3 | Okay | T2 |

FIG. 4B (Prior Art)

Diet 423

| Name 302 | Breakfast 442 | Lunch 444 | Dinner 446 |
|---|---|---|---|
| Patrick 308 | Healthy | Okay | Poor |
| Nancy 310 | Okay | Healthy | Poor |
| Bill 312 | Okay | Poor | Healthy |

FIG. 5A (Prior Art)

Employee 301

| Name 302 | DOB 304 | Fitness 306 | Diet 522 |
|---|---|---|---|
| Patrick 308 | 1/1/1 | Good | T2 |
| Nancy 310 | 10/10/10 | Bad | T2 |
| Bill 312 | 1/2/3 | Okay | T2 |

FIG. 5B (Prior Art)

Diet 523

| Name 302 | Breakfast 542 | Lunch 544 | Dinner 546 |
|---|---|---|---|
| Patrick 308 | Healthy | Okay | T3 |
| Nancy 310 | Okay | Healthy | T3 |
| Bill 312 | Okay | Poor | T3 |

FIG. 5C (Prior Art)

Dinner 547

| Name 302 | Early 562 | Late 564 |
|---|---|---|
| Patrick 308 | Healthy | Okay |
| Nancy 310 | Poor | Healthy |
| Bill 312 | Okay | Poor |

```
701    <Employee type = "Manager">
702        <Name> Patrick </Name>
703        <DOB> 1907 </DOB>
704        <Fitness/>
705        <Diet>
706            <Breakfast> Doughnuts </Breakfast>
707            <Lunch> Pizza </Lunch>
708            <Dinner> Beer </Dinner>
709        </Diet>
710    </Employee>
```

(File: Patrick.xml)

1000

| | Node ID | attribute | tag value | parent ID | first child ID | next sibling ID |
|---|---|---|---|---|---|---|
| 1001 | Patrick.xml | | | | Employee | |
| 1002 | Employee | Manager | | Patrick.xml | Name | |
| 1003 | Name | | Patrick | Employee | | DOB |
| 1004 | DOB | | 1907 | | | Fitness |
| 1005 | Fitness | | | | | Diet |
| 1006 | Diet | | | | Breakfast | |
| 1007 | Lunch | | Pizza | | | Dinner |
| 1008 | Dinner | | Beer | | | |
| 1009 | Breakfast | | Doughnuts | Diet | | Lunch |

FIG. 10

| T1 | Node ID | attribute | tag value | parent ID | child array |
|---|---|---|---|---|---|
| 1101 | Patrick.xml | | | | T2 |
| 1102 | Employee | Manager | | Patrick.xml | T2 |
| 1103 | Name | | Patrick | Employee | |
| 1104 | DOB | | 1907 | Employee | |
| 1105 | Fitness | | | Employee | |
| 1106 | Diet | | | Employee | T2 |
| 1107 | Lunch | | Pizza | Diet | |
| 1108 | Dinner | | Beer | Diet | |
| 1109 | Breakfast | | Doughnuts | Diet | |

FIG. 11A

| T2 | Node ID | child ID |
|---|---|---|
| 1181 | Patrick.xml | Employee |
| 1182 | Employee | Name |
| 1183 | Employee | Diet |
| 1184 | Employee | DOB |
| 1185 | Employee | Fitness |
| 1186 | Diet | Breakfast |
| 1187 | Diet | Dinner |
| 1188 | Diet | Lunch |

FIG. 11B

| | Node ID | child ID |
|---|---|---|
| 1191 | Patrick.xml | Employee |
| 1192 | Employee | Name, Diet, DOB, Fitness |
| 1193 | Diet | Breakfast, Dinner, Lunch |

FIG. 11C

| T1 | Node ID | attribute | tag value | parent | child |
|---|---|---|---|---|---|
| 1401 | Patrick.xml | | | | Chunk 1 |
| 1402 | Chunk 1 | | | Patrick.xml | T2 |
| 1403 | DOB | | 1907 | Chunk 1 | |
| 1404 | Fitness | | | Chunk 1 | |

FIG. 14A

| T2 | Node ID | child ID |
|---|---|---|
| 1481 | Chunk 1 | Chunk 2 |
| 1482 | Chunk 1 | DOB |
| 1483 | Chunk 1 | Chunk 3 |
| 1484 | Chunk 1 | Fitness |
| 1485 | Diet | Breakfast |
| 1486 | Diet | Dinner |
| 1487 | Diet | Lunch |

FIG. 14B

| Chunk 1 | Node ID | attribute |
|---|---|---|
| 1421 | Employee | Manager |

FIG. 14C

| Chunk 2 | Node ID | value |
|---|---|---|
| 1431 | Name | Patrick |

FIG. 14D

| Chunk 3 | Node ID | attribute | tag value | parent | child |
|---|---|---|---|---|---|
| 1441 | Diet | | | Chunk 1 | T2 |
| 1442 | Lunch | | Pizza | Diet | |
| 1443 | Dinner | | Beer | Diet | |
| 1444 | Breakfast | | Doughnuts | Diet | |

FIG. 14E

| object | field | key | type | nulls | comment |
|---|---|---|---|---|---|
| document | document_id | pk | number | no | |
| | url | | string | no | |
| | text_content | | clob | | supports limited text search |
| | binary_content | | blob | | doesn't need to be re-parsed |

| object | field | key | type | nulls | comment |
|---|---|---|---|---|---|
| document | document_id | pk | number | no | |
| | url | | string | no | |
| node | document_id | fk; pk1:1 | number | no | cascading delete |
| | preorder_position | pk1:2 | number | no | |
| | owner_position | | number | | parent's position |
| | class_id | fk; ie | number | no | |
| | search_path | ie | string | no | e.g. "ns1:tag1/ns2:tag2/..." |
| | value | | string | | |
| | blob_value | | blob | | |
| | child_document_id | fk | number | | used when linking to a child document |
| class | class_id | pk | number | no | |
| | node_type | | number | no | Node.ELEMENT_NODE, etc. |
| | local_name | ie; ie1:2 | string | | |
| | namespace_id | fk; ie1:1 | number | | |
| | prefix | | string | | |
| namespace | namespace_id | pk | number | no | |
| | namespace_uri | ak | string | no | |

| object | field | key | type | nulls | comment |
|---|---|---|---|---|---|
| node | node_id | pk | number | no | |
| | owner_edge_id | fk | number | no | cascading delete |
| | class_id | fk; ie | number | no | |
| | first_attribute_edge_id | fk | number | | |
| | first_child_edge_id | fk | number | | |
| | value | | string | | |
| | blob_value | | blob | | |
| edge | edge_id | pk | number | no | |
| | parent_node_id | fk | number | no | cascading delete |
| | child_node_id | fk; ie | number | no | |
| | next_edge_id | fk | number | | |
| | previous_edge_id | fk | number | no | |
| class | class_id | pk | number | no | |
| | node_type | | number | no | Node.ELEMENT_NODE, etc. |
| | local_name | ie; ie1:2 | string | | |
| | namespace_id | fk; ie1:1 | number | | |
| | prefix | | string | | |
| namespace | namespace_id | pk | number | no | |
| | namespace_uri | ak | string | no | |

| object | field | key | type | nulls | comment |
|---|---|---|---|---|---|
| attribute_type | edge_id | | number | no | globally unique id |
| | class_id | fk | number | no | |
| | value | | string | | |

| object | field | key | type | nulls | comment |
|---|---|---|---|---|---|
| child_type | edge_id | | number | no | globally unique id |
| | node_id | fk | number | no | |
| | link_id | fk | number | | |

| object | field | key | type | nulls | comment |
|---|---|---|---|---|---|
| node | node_id | pk | number | no | |
| | owner_node_id | fk | number | no | cascading delete |
| | owner_edge_id | | number | no | |
| | class_id | fk; ie | number | no | |
| | attributes | | array | | array of attribute_type objects |
| | children | | array | | array of child_type objects |
| | value | | string | | |
| | blob_value | | blob | | |

| object | field | key | type | nulls | comment |
|---|---|---|---|---|---|
| link | edge_id | pk | number | no | |
| | parent_node_id | fk | number | | cascading delete |
| | child_node_id | fk; ie | number | | |

| object | field | key | type | nulls | comment |
|---|---|---|---|---|---|
| class | class_id | pk | number | no | |
| | node_type | | number | no | Node.ELEMENT_NODE, etc. |
| | local_name | ie; ie1:2 | string | | |
| | namespace_id | fk; ie1:1 | number | | |
| | prefix | | string | | |

| object | field | key | type | nulls | comment |
|---|---|---|---|---|---|
| namespace | namespace_id | pk | number | no | |
| | namespace_uri | ak | string | no | |

FIG. 18

| object | field | key | type | nulls | comment |
|---|---|---|---|---|---|
| member_type | edge_id | | number | no | globally unique id |
| | class_id | fk; ie | number | | |
| | attribute_count | | number | | |
| | child_count | | number | | |
| | value | | string | | |
| | child_chunk_id | fk | number | | used when linking to a child chunk |
| chunk | chunk_id | pk | number | no | |
| | owner_chunk_id | fk | number | no | cascading delete |
| | owner_edge_id | | number | no | |
| | root_class_id | fk; ie | number | no | |
| | members | | array | | array of member_type objects |
| | blob_value | | blob | | |
| link | edge_id | pk | number | no | |
| | parent_chunk_id | fk | number | | cascading delete |
| | child_chunk_id | fk; ie | number | | |
| class | class_id | pk | number | no | |
| | node_type | | number | no | Node.ELEMENT_NODE, etc. |
| | local_name | ie; ie1:2 | string | | |
| | namespace_id | fk; ie1:1 | number | | |
| | prefix | | string | | |
| namespace | namespace_id | pk | number | no | |
| | namespace_uri | ak | string | no | |

FIG. 19

METHOD AND APPARATUS FOR DATABASE MAPPING OF XML OBJECTS INTO A RELATIONAL DATABASE

FIELD OF THE INVENTION

The present invention pertains to database mapping. More particularly, the present invention relates to a method and apparatus for database mapping of XML objects into a relational database.

BACKGROUND OF THE INVENTION

Many companies are adopting the use of XML (extensible Markup Language) for a variety of applications, such as, database information, etc. XML is a well formed language and is a tree structure style of database. Currently, many companies have access to and can obtain relational database (RDB) systems. Relational databases are well known, have good support, and a wide variety of available tools. For example, most RDB installations have provisions for system backup, maintenance, query language interfaces, etc. The maturity of these tools makes the RDB a robust and stable platform. However, a RDB is a very structured database. As such, it is difficult to map other database structures to the RDB model. For example, tree structured databases are not easily and/or efficiently mapped to the traditional RDB column structure. This problem becomes apparent when trying to use XML on a RDB.

BRIEF DESCRIPTION OF THE DRAWINGS

The present invention is illustrated by way of example and not limitation in the figures of the accompanying drawings, in which like references indicate similar elements and in which:

FIGS. 3A, 3B, and 3C illustrate examples of a flat data structure;

FIGS. 4A and 4B illustrate an example of a relational database;

FIGS. 5A, 5B, and 5C illustrate another example of a relational database;

FIG. 10 illustrates one embodiment of the linked lists representation as illustrated in FIG. 9 in a relational database with fixed table sizes;

FIG. 11A illustrates an example of use of a child array;

FIGS. 11B and 11C illustrate various embodiments of a child array;

FIGS. 14A, 14B, 14C, 14D, and 14E illustrate one embodiment of a relational database mapping of FIG. 13 using chunks into several fixed size tables;

FIG. 15 illustrates one embodiment of a logical data model using documents;

FIG. 16 illustrates one embodiment of a logical data model using node order;

FIG. 17 illustrates another embodiment of a logical data model using linked lists;

FIG. 18 illustrates another embodiment of a logical data model using arrays of objects; and FIG. 19 illustrates another embodiment of a logical data model using chunks.

DETAILED DESCRIPTION

A method and apparatus for database mapping of XML into a relational database are described.

The present invention by mapping a tree or graph type structure to a database which uses a fixed table size is able to make use of tools for such a table structured database. Thus, the present invention allows the use of existing database structures that may have significant support, tools, trained personnel, etc. This may allow users to minimize retraining, use existing tools, and reduce development time. For example, the ability to map XML to a relational database would allow the use of the relational database (tools and infrastructure.

Figure 1:
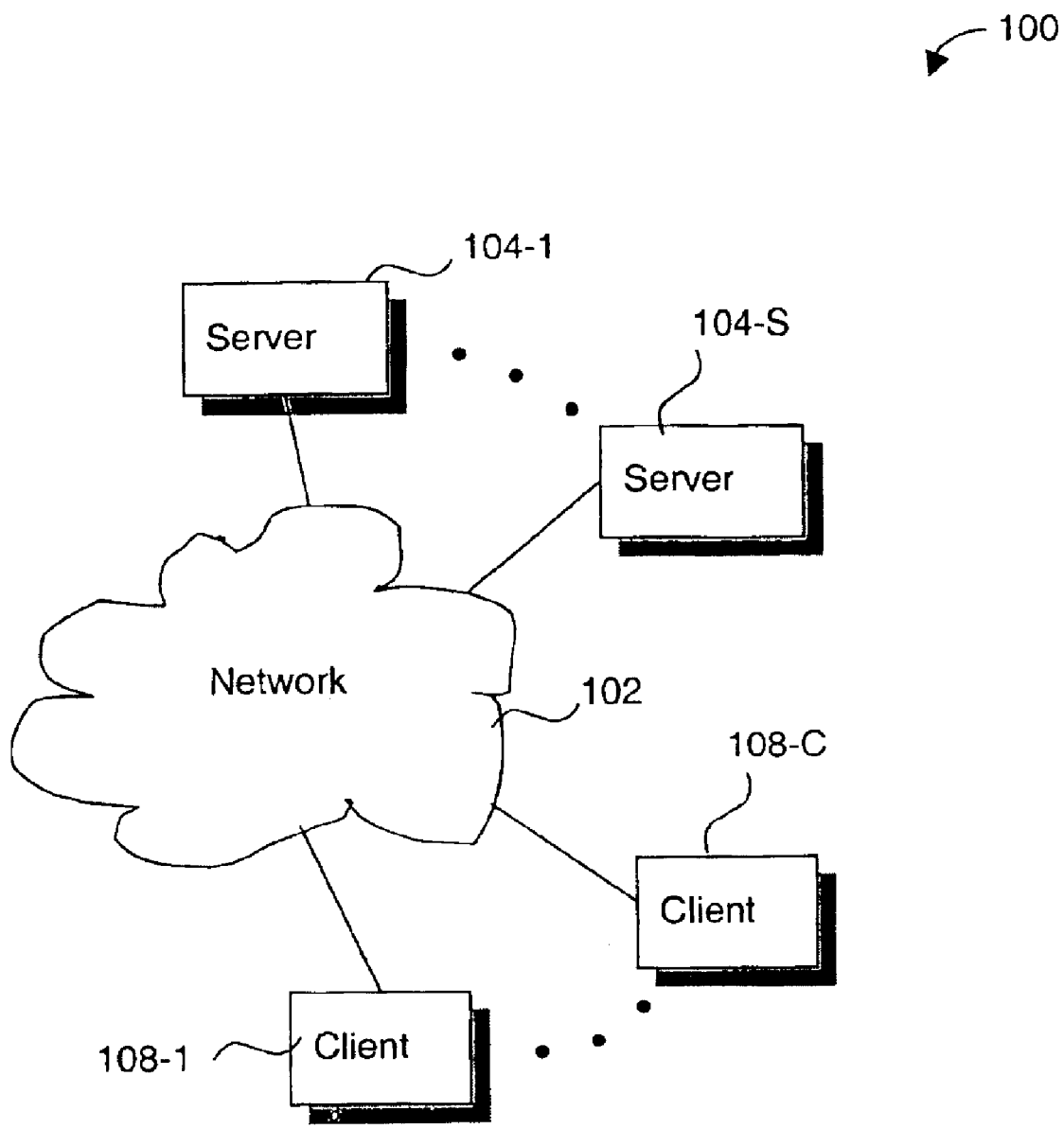
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
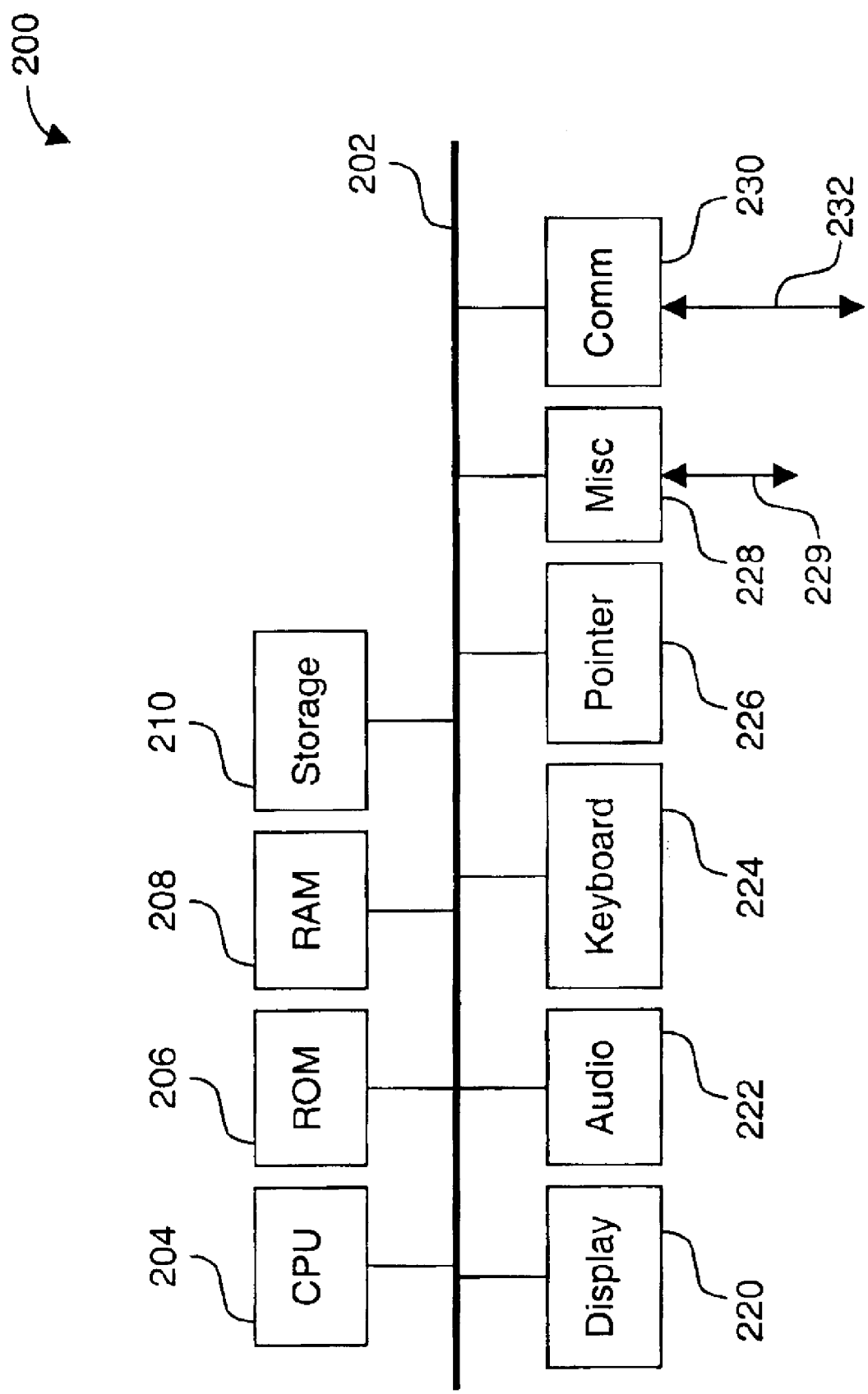
FIG. 2 is a block diagram of a computer system.

FIG. 2 illustrates a computer system 200 in block diagram form, which may be representative of any of the clients and/or servers shown in FIG. 1. More details are described below.

FIG. 3A illustrates a table 300 (denoted Table 1) listing Employee 301 information. Table 1 has columns for Name 302, Date of Birth (DOB) 304, and Fitness 306. Three employees have entries, Patrick 308, Nancy, 310, and Bill 312. Table 1 represents a first normal form (1NF) database structure. If a new entry "Diet" is to be added to the employee information, then, in one embodiment, a new column may be added. This is illustrated in FIG. 3B in which table 320 now has an added column Diet 322 and respective data entries of Healthy, Poor, and Okay for Patrick 308, Nancy 310, and Bill 312. If more detailed information is desired on the diet, then in one embodiment, additional columns for breakfast, lunch, and dinner may be added. FIG. 3C illustrates a table 340 in which columns for Breakfast 342, Lunch 344, and Dinner 346 have been added. FIGS. 3A, 3B, and 3C represent a flat data structure. As can be seen, the addition of new information categories requires that a new column be added. This requires working with the entire database table.

FIGS. 4A and 4B represent an alternative embodiment in which information in one table relates to another table having information. For example, in FIG. 4A table 400 (denoted Table 1) has Employee 301 information, however, under Diet 422, is a reference z to T2 (Table 2). Table 2 is a Diet table 440, having Diet 423 information, as illustrated in FIG. 4B, wherein the Name 302 in FIG. 4B relates to same Name 302 in FIG. 4A. Additionally, Table 2 now has entries for Breakfast 442, Lunch 444, and Dinner 446. FIGS. 4A and 4B are an example of a relational database. If new information related to an early or late dinner is desired, then in one embodiment, an additional relationship may be established to an additional table. FIGS. 5A, 5B, and 5C illustrate one such embodiment. Here table 500 (Table 1) has employee information and under Diet 522 reference is made to T2 (Table 2). Table 2 is a Diet table 540, with additional Diet 523 entries for Breakfast 542, Lunch 544, and Dinner 546. Entries under Dinner 546 all refer to T3 (Table 3). Table 3 is a Dinner table 560, with additional Dinner 547 entries for Early 562 and Late 564. The tables in FIGS. 5A, 5B, and 5C use the Employee name 302 as the unique identifier (key). Thus, in this relational database, new information may be added by setting up new tables and referring (also called linking, or referencing) to them. One advantage over the single flat file table approach is that individual tables may be updated and/or modified possibly without modifying or updating all other tables. For example, Bill 312 now has a Poor entry for a Late 564 dinner. If this entry needs to be changed, then only Table 3 560 needs to be modified, not Table 2 540, or Table 1 500.

Figure 6A:
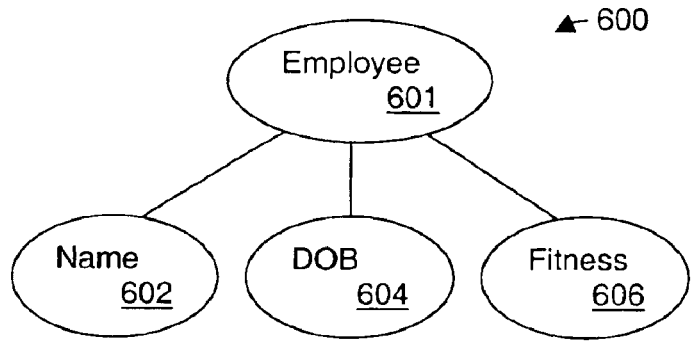
FIGS. 6A, 6E, and 6F illustrate a tree structure.
Figure 6B:
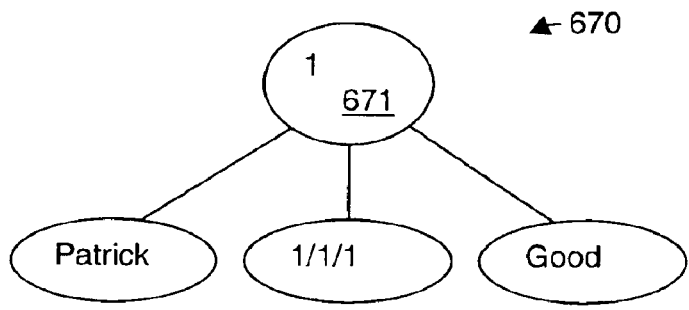
FIGS. 6B, 6C, and 6D illustrate data instances for the tree structure in FIG. 6A.
Figure 6C:
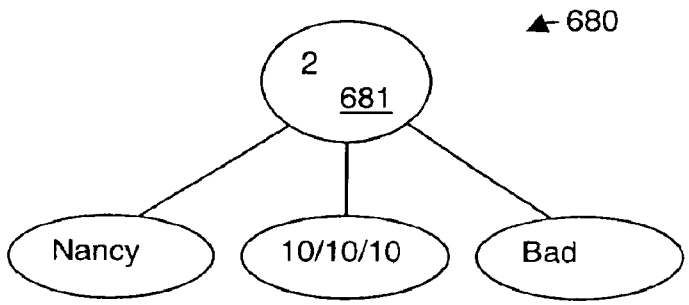
Figure 6D:
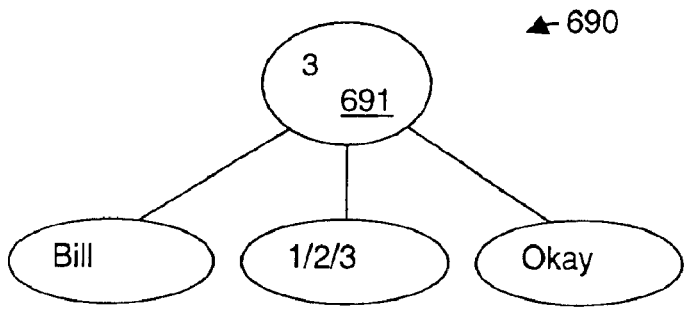

FIG. 6A is a tree structure 600 that illustrates a representation that can hold information similar to the table structure as illustrated in FIG. 3A. That is, in FIG. 3A Employee table 300 has columns for Name 302, DOB 304, and Fitness 306. FIG. 6A has a structure in tree form where Name 602, DOB 604, and Fitness 606 are subnodes (also called sub-nodes, children, or children nodes) of the parent (also called parent node, root, or root node) Employee 601. What is illustrated in FIG. 6A is a structure and not data. FIGS. 6B, 6C, and 6D are three data instances that show how data for each employee may be represented. In FIG. 6B an instance of data 670 has a data value of 1 for Employee 671 and the children have values of Patrick, 1/1/1, and Good, which respectively are as illustrated in FIG. 6A as Name 602, DOB 604, and Fitness 606. FIG. 6C illustrates an instance of data 680 having a data value of 2 for Employee 681 and the children have values of Nancy, 10/10/10, and Bad, which respectively are as illustrated in FIG. 6A as Name 602, DOB 604, and Fitness 606. FIG. 6D illustrates an instance of data 690 having a data value of 3 for Employee 691 and the children have values of Bill, 1/2/3, and Okay, which respectively are as illustrated in FIG. 6A as Name 602, DOB 604, and Fitness 606. As can be seen by examining FIG. 3A and FIGS. 6A–6D, the table and tree representations while having a different structure are capable of representing the same information.

Figure 6E:
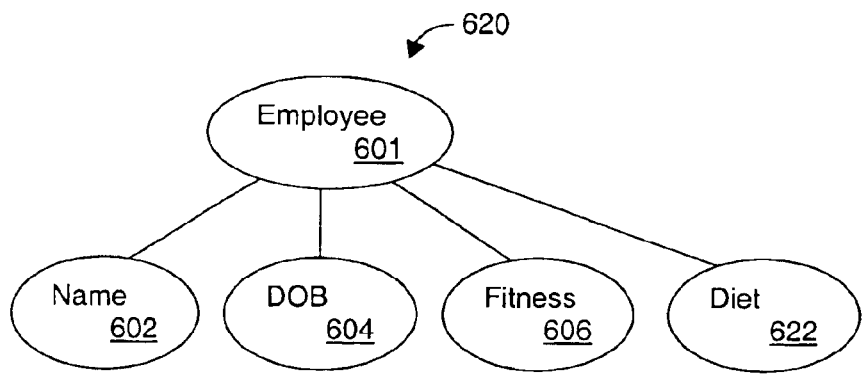
Figure 6F:
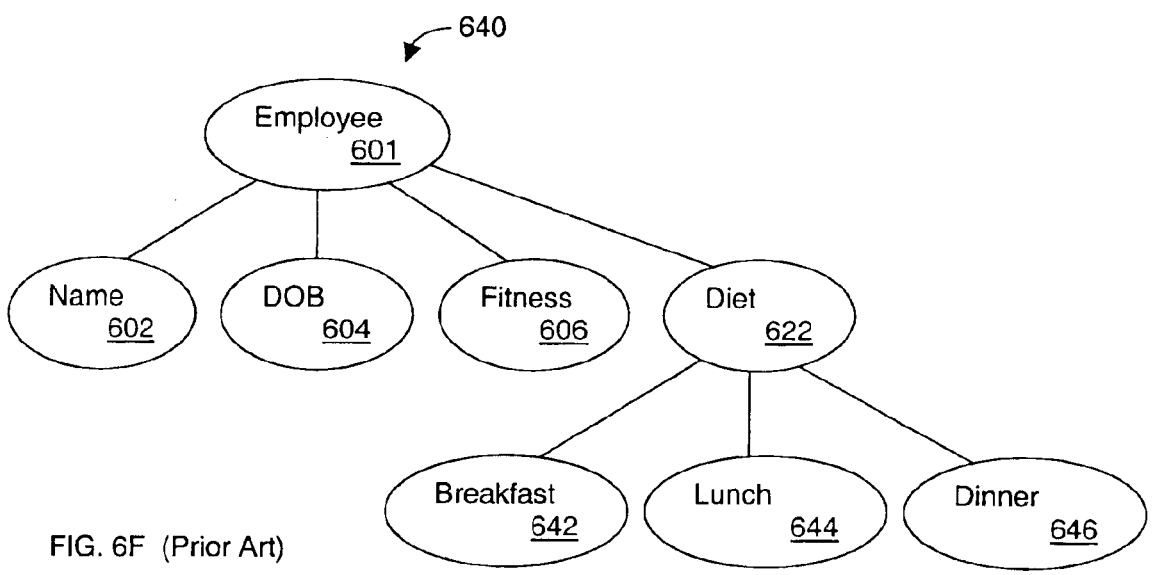

In a table structured database, the addition of a new information element, such as diet resulted in a new column (as illustrated in FIG. 3B, Diet 322) or a new table (as illustrated in FIG. 4B, table 440). In a tree structured database, the addition of a new information element, such as diet results in children (and/or sub-children) as is illustrated in FIGS. 6E and 6F. FIG. 6E illustrates the addition of Diet 622 as a child of root node Employee 601. FIG. 6F illustrates additional information Breakfast 642, Lunch 644, and Dinner 646 as children of node Diet 622. One skilled in the art will appreciate that children of other nodes may be used to indicate additional information related to the parent node. For example, under Name 602 may be children nodes for information related to first name, middle name, last name.

What is to be appreciated is that while a relational database requires links and additional tables for expanded information categories, a tree requires additional nodes and/or children.

XML is a well formed tree structure. XML is gaining popularity, however relational databases (RDB) are well known with many mature tools available, such as, Structured Query Language (SQL), good security implementations, good infrastructure, etc. Ideally an XML mapped to a RDB may be able to use these strengths. As was illustrated above, child nodes in a tree structure are difficult to represent in a RDB because of a single value in a column. Thus, the addition of children results in tables not being of a fixed size (i.e. columns). The present invention details an XML to RDB mapping that may be done with tables of fixed size. What is to be understood is that a fixed size refers to the columns and not the rows. The columns may be considered the types of data that may be stored, while the rows are considered different instances of such data. Thus, whereas a RDB uses tables with rows of columns of values and links, XML uses, for example, a document with tags (elements and possibly attributes), values, and a tree hierarchy.

Figures 7, 8:
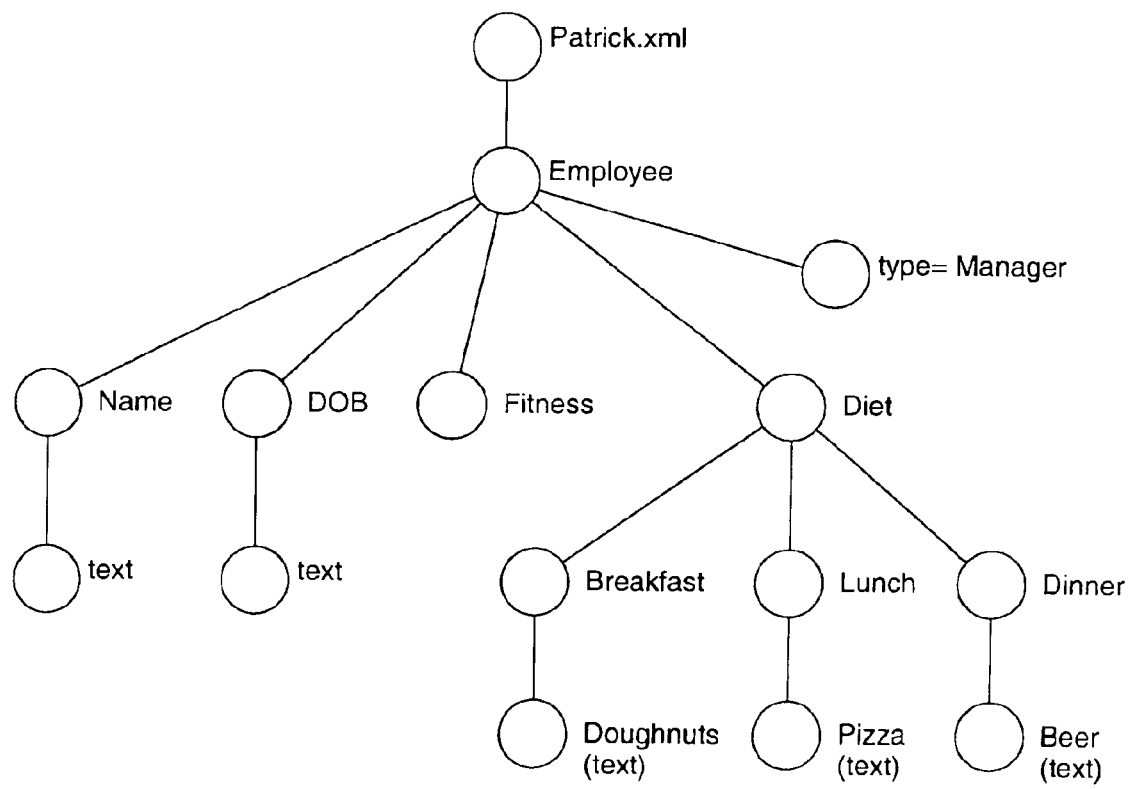
FIG. 7 illustrates a simplified XML document.
FIG. 8 illustrates a tree diagram for the XML document in FIG. 7.

FIG. 7 illustrates a simplified XML document 700 (a file named Patrick.xml) that will be used to illustrate the present invention. Lines 701 through 710 hold information related to an Employee. One skilled in the art will appreciate the tree hierarchy in FIG. 7 as being well formed. For example, line 702 Name denotes a child node of 701 Employee, and that Name has a value of Patrick. Diet at 705 has three children Breakfaxt 706, Lunch 707, and Dinner 708, with the respective values of Doughnuts, Pizza, and Beer. Line 704 denotes a node Fitness that has no value at in this file.

<Employee> and </Employee> are start and closing tags respectively. Employee is an element. Elements may also be given values by the use of an attribute. For example, <Employee type="Manager"> 701 is a example of an element (Employee) having an attribute (type) with a value of "Manager". What is to be understood is that attributes may only be within elements, that attributes cannot have children, that elements may have children, and that a node is considered an atomic unit.

Now various node types within an XML document object model (DOM) are currently defined. The following is the list of DOM node types:

public static final short ELEMENT_NODE=1;
public static final short ATTRIBUTE_NODE=2;
public static final short TEXT_NODE=3;
public static final short CDATA_SECTION_NODE=4;
public static final short ENTITY_REFERENCE_NODE=5;
public static final short ENTITY_NODE=6;
public static final short PROCESSING_INSTRUCTION_NODE=7;
public static final short COMMENT_NODE=8;
public static final short DOCUMENT_NODE=9;
public static final short DOCUMENT_TYPE_NODE=10;
public static final short DOCUMENT_FRAGMENT_NODE=11;
public static final short NOTATION_NODE=12;

FIG. 8 illustrates a tree diagram for the file Patrick.xml file as illustrated in FIG. 7. The hierarchical structure is clearly evident with the node Employee having an attribute type=Manager, and four children Name, DOB, Fitness, and Diet. Fitness has no children. Breakfast, Lunch, and Dinner are children of node Diet, and have text values of Doughnuts, Pizza, and Beer respectively. Note that Name as a child node has a text value 4 which is not shown here, but which from FIG. 7 would be Patrick. DOB has a child node holding a text value, which from FIG. 7 would be 1907. From the above XML node listing, the attribute node type=manager would be a node type 2. Text nodes would be type 3. Employee, Name, DOB, Fitness, Diet, Breakfast, Lunch, and Dinner would be examples, in this illustration, of element node type 1.

Now a default mapping of XML into a RDB would be where each XML document would occupy a single row of a RDB table. This is a course grained approach, and as explained previously does not result in a fixed table size. Variations on this approach are also course grained and/or result in not having fixed sized tables. One such variation is the use of auxiliary fields or tables that are referenced. Another variation is storing the content as a text blob, which would also be course grained.

In one embodiment of the present invention, the XML to RDB representation is based upon a linked list mapping. A linked list mapping, as disclosed herein, is capable of representing a tree structure. One such linked list mapping is:

Node ID, tag value, parent ID, first child ID, next sibling ID

What is to be appreciated is that such a fixed structure is capable of representing a tree structure, such as an XML document. The fixed structure is capable of being easily mapped to a RDB with fixed tables.

Figure 9:
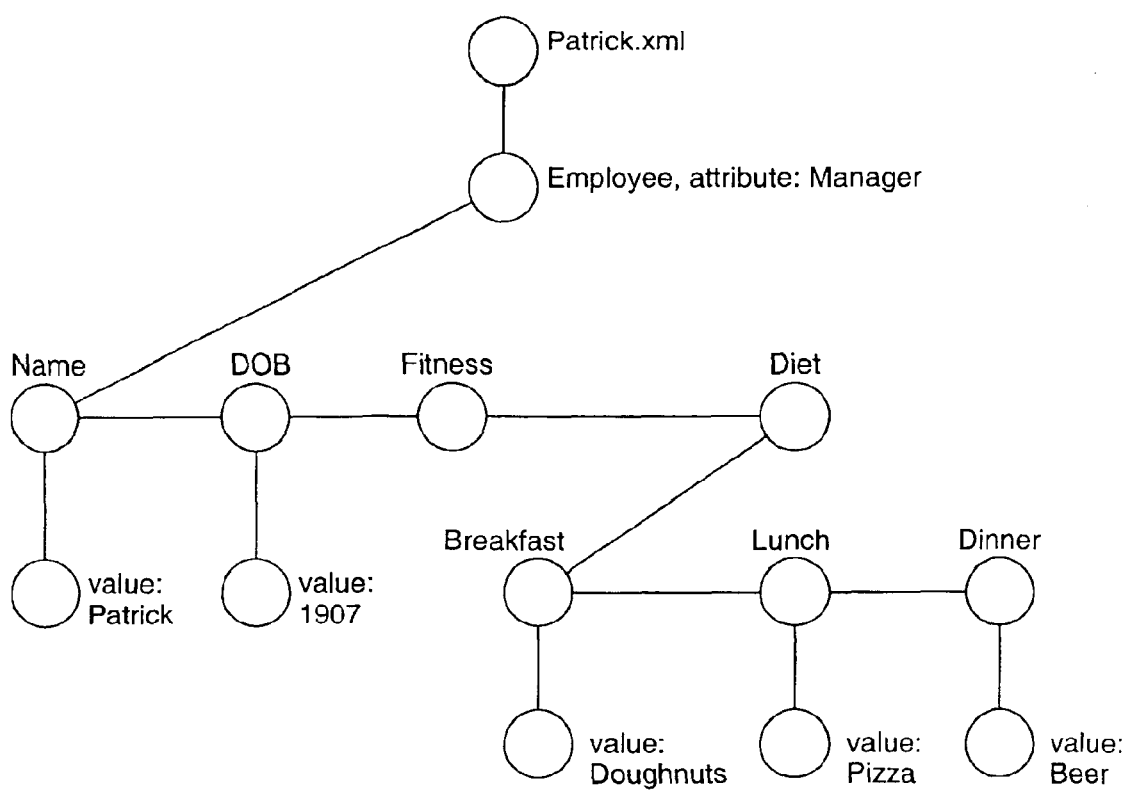
FIG. 9 illustrates one embodiment of a linked lists representation of FIG. 8.

The linked list representation may be thought of as a navigational representation in which all the nodes, children, etc. of a tree may be represented and reached. For example, FIG. 9 is a linked list representation of FIG. 8 using the linked list mapping of:

Node ID, attribute, tag value, parent ID, first child ID, next sibling ID. Thus for example, node Patrick.xml is the root node having a single child node Employee with an attribute of Manager. On the other hand, node DOB has no children but has a value of 1907. Node Fitness has no children, no attributes, but has a previous sibling of DOB and a next sibling of Diet.

FIG. 10 represents this linked list mapping in a RDB with fixed table sizes 1000. Across the top are the columns that correspond to our linked list mapping:

Node ID, attribute, tag value, parent ID, first child ID, next sibling ID

An empty entry indicates that no value is present. Root node Patrick.xml at 1001 has only a first child ID of Employee. Node Employee has an attribute Manager and parent ID of Patrick.xml and a first child ID Name. The node ID Name has a tag value of Patrick a parent ID of Employee and a next sibling of DOB. What is to be appreciated is that the table size is fixed and that the row entries may be in any order.

For example, at row 1006 is Node ID Diet with a first child ID of Breakfast. However, the next entry in the RDB at 1007 is the Node ID of Lunch. Breakfast Node ID is at row 1009, however one can traverse the linked list and reach all nodes in the tree. Thus, what has been detailed above is a way to map an XML document to a RDB using a fixed table size.

Many other variations of linked list are also possible, for example:

Node ID, tag value, owner ID, last child ID, previous sibling ID

Node ID, attribute, tag value, owner ID, last child ID, previous sibling ID

Node ID, tag value, first owner ID, second owner ID, first child, last child ID, previous sibling ID, etc.

The example given, by necessity has not included all variations possible using, for example, XML. Detailed below is another embodiment of a logical model data model using linked lists, which by its nature has additional support for XML features, and is fine grained. Note that linked list mapping is capable of representing any current specification XML document and/or data.

Figure 12:
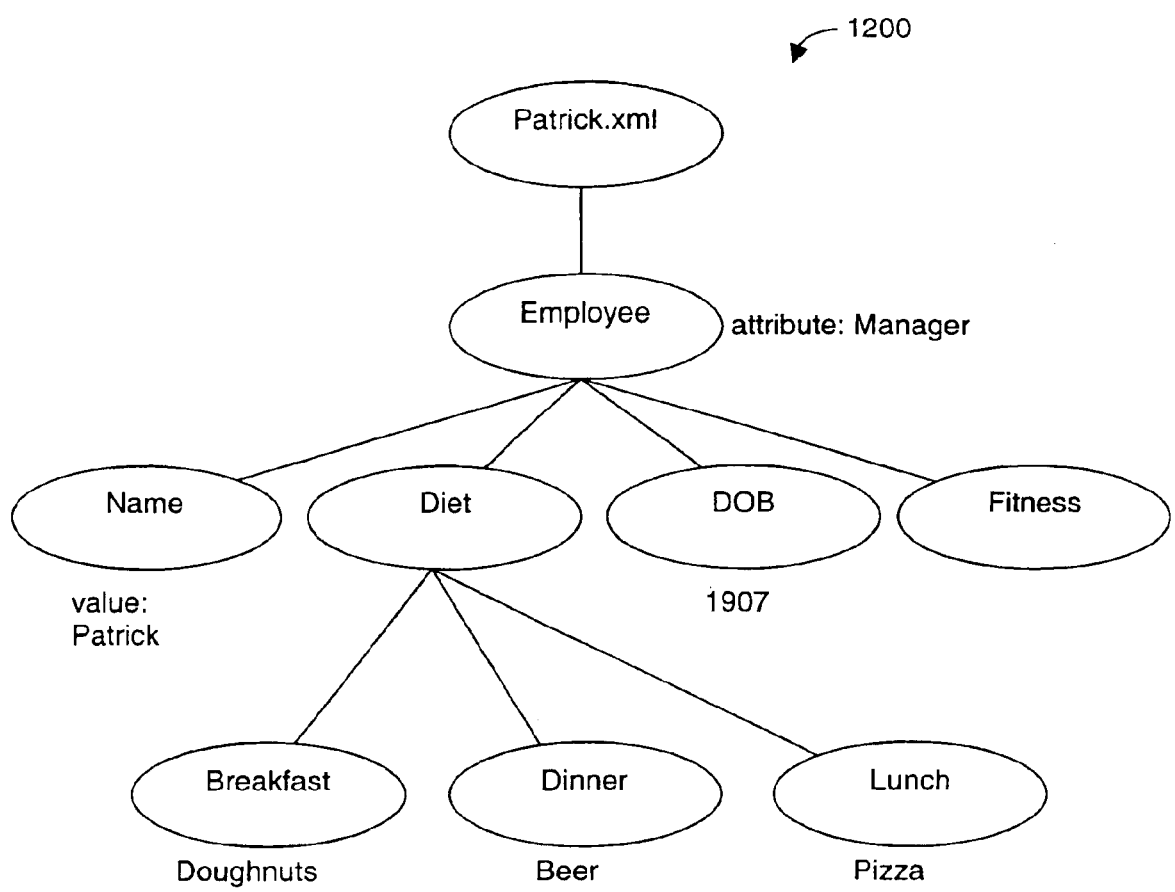
FIG. 12 illustrates another embodiment of a tree structure.

In addition to linked list mapping, other variations are also possible. For example, in another embodiment of the present invention, a logical data model using array of objects may be used. In this approach a column in a RDB table may hold an array of values. Into this array may be placed for example the node ID of all children. FIG. 11A illustrates a table 1 (T1) 1100 where a child array is used. FIG. 11B illustrates child array T2 1180. Going through T1 and T2, left to right and top to bottom would yield a tree structure as illustrated in FIG. 12. Note it has the same information as FIG. 8, some of the nodes are simply shifted left or right. Note that the node labels are now inside the nodes and attributes are shown next to the node. Values for a node are also shown next to the node and for Name the explicit labeling of value: is shown. For other nodes, such as DOB the 1907 next to the node denotes the node value. FIG. 11C illustrates an alternative embodiment for a child array 1190 in which the child ID field is capable of holding more than one value. Thus, for example, at 1193 the children of Diet are all denoted in a single row as Breakfast, Dinner, Lunch. Note that in alternative embodiments a plurality of child arrays may be used. For example, additional tables T3, T4, etc., may be used to indicate relations to child arrays. One skilled in art will recognize many other possible variations, including for example, parent array(s).

Again, the example given for arrays, by necessity has not included all variations possible using, for example, XML. Detailed below is another embodiment of a logical model data model using arrays of objects, which by its nature has additional support for XML features, and is fine grained. Note that arrays of objects mapping is capable of representing any current specification XML document and/or data.

In yet another embodiment of the present invention, a logical data model using chunks may be used. Chunks are groupings of objects. The chunks may be variable in size and thus a variable grained approach is possible. A chunk may be viewed as an array of member type objects. Thus, for example, referring to FIG. 13, one chunk (Chunk 1) may be considered the Employee node with the type (=Manager in this Figure), a second chunk (Chunk 2) may be considered the node Name with the text value (Patrick), and a third chunk (Chunk 3) may be the node Diet and all that is below it (Breakfast, Lunch, Dinner and the respective text values). As can be seen the three different chunks vary in size and vary in what they represent and in what data they may have.

Figure 13:
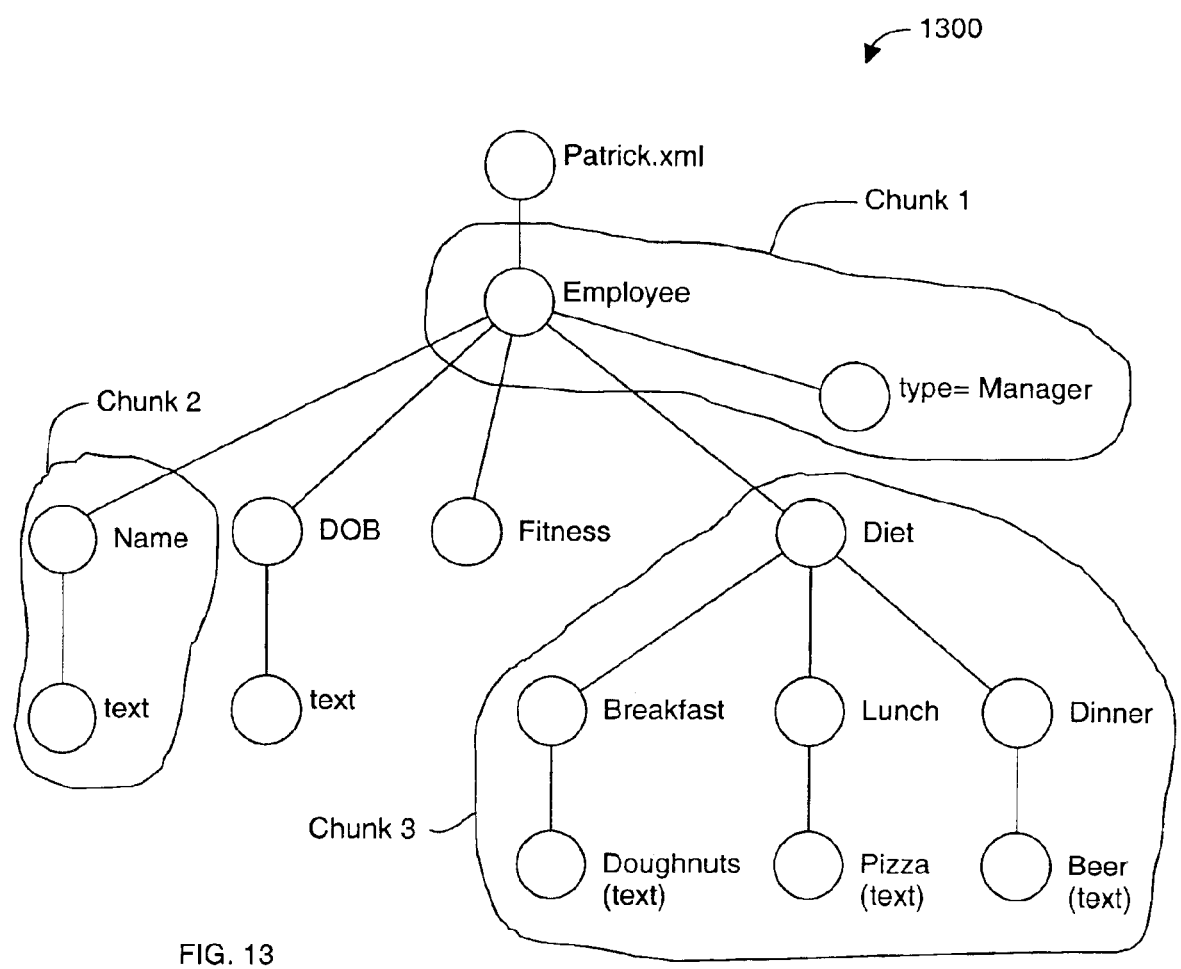
FIG. 13 illustrates one embodiment of using chunks on a tree structure.

For example, FIGS. 14A, 14B, 14C, 14D, and 14E illustrate a relational database (RDB) mapping of FIG. 13 using chunks into several fixed size tables. FIG. 14C illustrates that Chunk 1 has fields (columns) for Node ID and attribute. In this illustration, only a single entry (at line 1421) is present and it is Node ID=Employee and attribute= Manager. FIG. 14D illustrates that Chunk 2 has fields (columns) for Node ID and value only and in this illustration has a single entry (at line 1431) Name (for Node ID) and Patrick (for value). FIG. 14E illustrates that Chunk 3 has the same fields (columns) as FIG. 14A, namely, Node ID, attribute, tag value, parent, and child. Chunk 3 need not have the same fields as another table and is illustrated here to show it is possible. FIG. 14B is Table 2 an array to which reference is made, for example, in FIG. 14A as a child (line 1402) and FIG. 14E as a child (line 1444).

A verbal walkthrough of the chunk approach will now be given and reference will be made to FIGS. 13 and 14A–E. The reader should follow in both Figures. Table 1 FIG. 14A indicates at line 1401 that Node ID Patrick has only a child Chunk 1. On line 1402 Chunk 1 has no attributes as a Chunk 1 (however, inside Chunk 1 FIG. 14C it can be seen that Employee has an attribute of Manager). Chunk 1 line 1402 has a parent Patrick.xml and a child in array T2 FIG. 14B. Line 1403 DOB has a tag value of 1907 and a parent of Chunk 1. Fitness line 1404 has only a parent Chunk 1.

Now going back to line 1401 there is a child Chunk 1. Chunk 1 FIG. 14C has a single entry 1421 indicating a Node ID of Employee and an attribute of Manager. This is what is illustrated in FIG. 13 Chunk 1.

Now at line 1402 Chunk 1 has child T2 illustrated in FIG. 14B. Going to FIG. 14B we see that at 1481, 1482, 1483, and 1484 that Chunk 1 has child IDs of Chunk 2, DOB, Chunk 3, and Fitness. This is as illustrated in FIG. 13.

At 1403 we see that DOB has a value of 1907 and a parent of Chunk 1. This is also illustrated in FIG. 13.

At 1404 Fitness has only a parent of Chunk 1. This is also illustrated in FIG. 13.

Now, returning to 1402 we saw that child T2 at 1481 referenced Chunk 2. Chunk 2 at FIG. 14D line 1431 indicates that a Node ID of Name has a value of Patrick. Again, this agrees with the illustration of FIG. 13.

Now, 1402 child T2 also refers to Chunk 3 at 1483. Looking at Chunk 3 FIG. 14E we see that there are Nodes Diet, Lunch, Dinner, and Breakfast. However, we came to Chunk 3 based on a reference from Chunk 1 (line 1483, Chunk 1 references Chunk 3), therefore if we look in the parent column, we see that only node Diet has Chunk 1 as a parent, therefore Chunk 1 must have the node Diet in Chunk 3 as a child node. Reference FIG. 13 where the reader can see inside the chunks and see that Chunk 1 does in fact have Diet in Chunk 3 as a child.

Following along, Diet at 1441 refers to child T2. Now we know that we are going to T2 from Chunk 3. Going to T2 FIG. 14B we find that node Diet at 1485, 1486, and 1487 has three children Breakfast, Dinner, and Lunch respectively. Now, returning to Chunk 3 FIG. 14E (since we came from it), we see that at 1442, 1443, and 1444 are the nodes Lunch Dinner, and Breakfast and that they have tag values of Pizza, Beer, and Doughnuts respectively and that each has the same parent Diet. This is as illustrated in FIG. 13.

Thus, what has been illustrated is an array of objects of varying groupings (chunks) that are mapped into fixed sized tables.

One skilled in the art will recognize that while the array of objects as illustrated in FIGS. 14A–E uses an array approach, alternative embodiments may use a linked list to an array of objects (chunks) approach.

The example given, by necessity has not included all variations possible using, for example, XML. Detailed below is another embodiment of a logical model data model using chunks, which by its nature has additional support for XML features, and is variable-grained. Note that by using chunks is it possible to represent any current specification XML document and/or data.

FIG. 15 illustrates one embodiment 1500 of a logical data model using documents, such as XML, to map to a table, for example, in a relational database (RDB). This example is course grained because it is a simple data model that stores each XML document as a Large Object(s) (LOB). The grouping feature is implemented using a separate set of tables (not shown). This data model supports fast update and retrieval, because an entire document is stored in only one database row. Support for a structured search would require loading and/or parsing the entire document. As can be seen in FIG. 15 the columns are object, field, key, type, nulls, and comment. Here there is only one object supported and it is a document, such as an XML document. The various fields in the object document support a document_id, a universal resource locator (url), text and binary content. In the key field, pk denotes primary key and here the primary key is the document_id field. Type refers to the type of data supported, for example, number data, string data, character large object (s) (clob) data, and binary large object(s) (blob) data. The nulls field indicates information as to whether the respective data may be null. The comment field has some additional documentation. Please note that the nulls field and the comments field are not necessary for implementation, but are shown in the figures to help the reader understand the logical data model(s).

FIG. 16 illustrates one embodiment 1600 of a logical data model using node order in XML to map to tables in a relational database. This example is fine grained because XML units (nodes) are exposed in the relational schema. This node order model stores the preorder traversal position of the nodes in an XML document and uses the position to reassemble the XML tree with the correct hierarchy and ordering. The search_path and value fields provide for a structured search. The child_document_id field is used to establish hierarchical relationships between documents. This can be used to implement both grouping and sharing, and also enforces referential integrity on shared objects. The blob_value field allows images and other assets to be embedded within the XML context. Using standard relational data normalization, the class and namespace tables are separated from the node table. Thus, in this example of a node order mapping, the logical model supports four objects: document, node, class, and namespace. Under key, pk denotes primary key, fk denotes foreign key, ie denotes inverted entry and notation such as pk1:1 denotes the first part of the composite primary key.

FIG. 17 illustrates an embodiment 1700 of a logical data model using linked lists to map to tables. This example is fine grained. The linked lists approach is a generic data model for trees and graphs. Its name comes from its use of linked lists of edges to capture sibling relationships among nodes. The linked lists model supports full structured search by exposing both the structure and data values, of for example XML data. As such, the XML query language XPath/XQuery may be used on this structure. This model supports grouping by allowing XML document nodes (the root nodes of XML documents) to be children of other nodes. And it supports sharing by allowing any XML node to be reached from multiple parents (we call this XML normalization). Under key, ak denotes alternate key. As is illustrated, this example of a linked lists approach supports four objects: node, edge, class, and namespace. More information related to, for example, XML is supported in the model via such objects as class and namespace and the associated fields.

FIG. 1B illustrates an embodiment 1800 of a logical data model using arrays of objects. This example is fine grained. The array of objects model is capable of taking advantage of some non-relational features in database systems. Specifically, this model example takes advantage of support for array-valued columns. Array-valued columns may store variable-length arrays of structured types. In this embodiment, the model uses array-valued columns instead of linked lists to maintain the attribute list and child list of each node.

FIG. 19 illustrates an embodiment 1900 of a logical data model using chunks. This example is variable-grained because the chunks may be a varying size. That is, for example, this is a data model that allows XML data to be partitioned in variable-sized chunks. Whole chunks may be shared, retrieved, or updated, while a structured search may include conditions on individual nodes. The chunk model allows a tradeoff between C performance and data granularity. However, because the chunks can be variable in size, in any implementation it may require either that the data be partitioned in advance, or there be m logic to partition and re-partition the data as needed.

Thus, various embodiments of how to map objects, such as XML, onto a database, such as a relational database, have been described.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantifies within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of skill in the art will immediately appreciate that the invention can be practiced with computer system configurations other than those described, including handheld devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Reference has been made to the extensible markup language (XML). It is to be understood that XML is an evolving language and as such that those aspects consistent with the present invention may evolve over time. Such concepts, as for example, well formed which is one of the basic underpinnings of XML is not likely to change. However, on the other hand, support for other data types, such as streaming media may well be defined in the future. As such, the present invention's display specification is to be understood as encompassing these extensions. The XML specification and related material may be found at the website of the World Wide Web Consortium (W3C) located at http://www.w3.org.

Reference has been made to "mapped into" and/or "mapped onto" or such like words. What is to be understood is that such terms as "into" or "onto" refer to an alternative way of representing one structure in terms on another structure and not that they are "in" or "on" such a structure. This alternative representation is performed by the "mapping."

Likewise, data may be represented in alternative forms in different structures. For example, some structures may only support text or characters, in which case the representation of numbers may be by, for example, quoted strings. Another example is a database that supports dates, while another has no such support and so an alternative representation is needed.

Reference has been made to field, tree, graph, node, element, object, data, attribute, etc. Some of these terms as understood by one skilled in the art are often considered interchangeable and/or having the same essence in differing structures or schemes. For example, in a table database, such as a relational database, a unit of data may be in a field, this same unit of data in an XML environment may be in an entity called an attribute or a value. A node in XML may be called an object in an object oriented database. Nodes may be called a root if the node is at the top and children may be called sub-nodes. Nodes at the same level may be called siblings, etc. What is to be appreciated is that in the art, the words sometimes have meanings commensurate with the surrounding environment, and yet often the words are used interchangeably without respect to the specific structure or environment, i.e. one skilled in the art understands the use and meaning.

Thus, a method and apparatus for database mapping of objects into a relational database have been described.

What is claimed is:

1. A method for representing an extensible Markup Language (XML) data structure as a fixed set of tables in a relational database (RDB), the method comprising:

(a) inputting the XML data structure;

(b) grouping at least one XML node and possibly any sub-node into a relationship selected from the group consisting of linked list, array of object, and chunk;

(c) generating a fixed sized table for the grouping in (b);

(d) if necessary, repeating (b) and (c) and creating references to any repeated groupings (b) and tables (c), until the XML data structure is completed; and (e) outputting the resulting fixed sized tables for use in a ROB.

* * * * *

UNITED STATES PATENT AND TRADEMARK OFFICE
CERTIFICATE OF CORRECTION

PATENT NO. : 6,925,470 B1
DATED : August 2, 2005
INVENTOR(S) : Sangudi et al.

It is certified that error appears in the above-identified patent and that said Letters Patent is hereby corrected as shown below:

Column 12,
Line 54, change "ROB" to -- RDB --.

Signed and Sealed this

Twenty-ninth Day of November, 2005

JON W. DUDAS
*Director of the United States Patent and Trademark Office*